M. HOGG.
AUTOMOBILE LOCK.
APPLICATION FILED FEB. 11, 1921.
1,411,728. Patented Apr. 4, 1922.
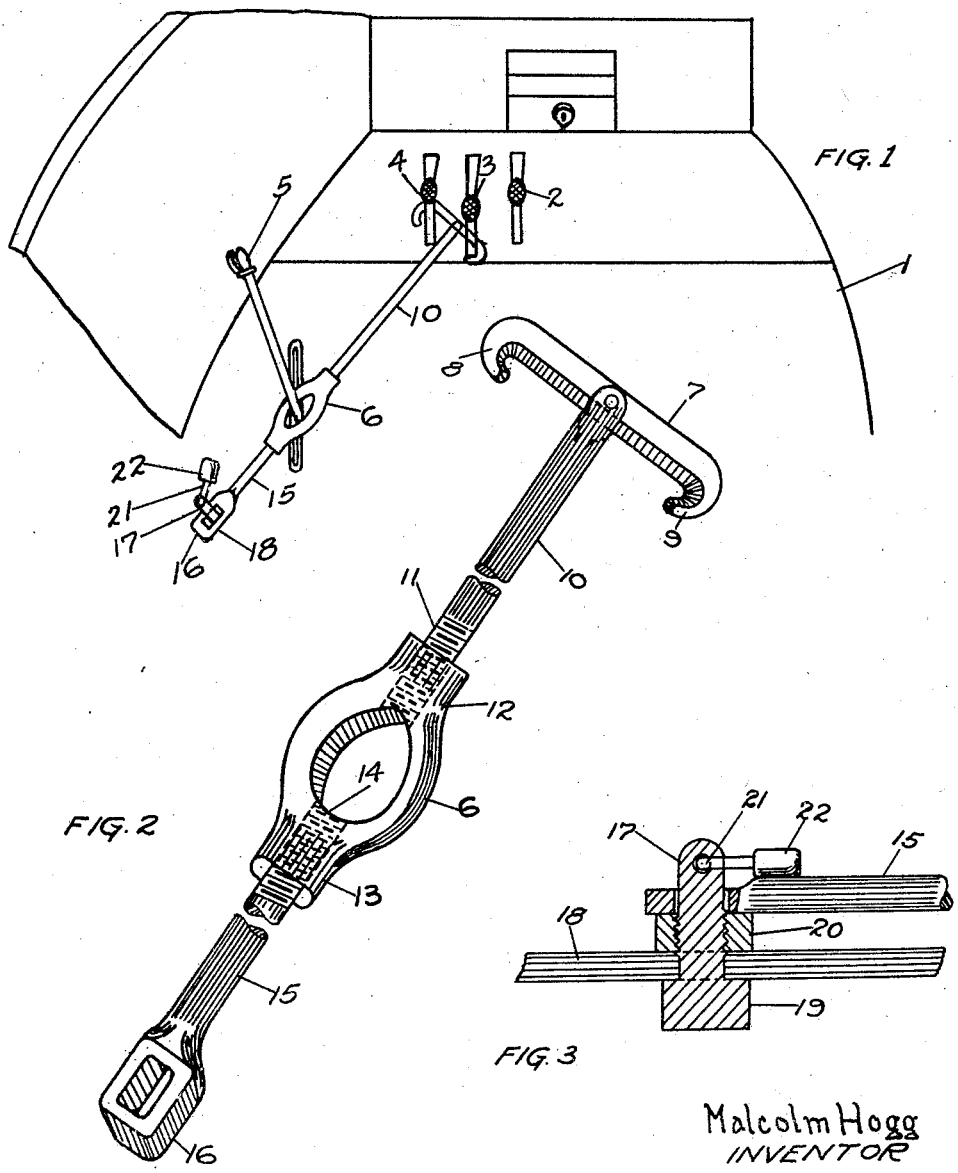
Malcolm Hogg
INVENTOR
BY *Harpman*
ATTORNEY

UNITED STATES PATENT OFFICE.

MALCOLM HOGG, OF YOUNGSTOWN, OHIO.

AUTOMOBILE LOCK.

1,411,728.      Specification of Letters Patent.      Patented Apr. 4, 1922.

Application filed February 11, 1921. Serial No. 444,215.

*To all whom it may concern:*

Be it known that I, MALCOLM HOGG, citizen of the United States of America, residing at 34 E. Chalmers Avenue, Youngstown, in the county of Mahoning and State of Ohio, have invented certain new and useful Improvements in Automobile Locks, of which the following is a specification.

This invention relates to automobile locks.

The principal object of this invention is to provide a locking means whereby the unauthorized driving or taking of a machine is guarded against.

Another object is to provide a positive lock and at the same time producing a locking means that is simple of construction, operation, and low in cost of manufacture.

Another object is to provide a locking means that is adjustable.

The drawing illustrates a preferred embodiment of the invention However, it is to be understood that in adapting the same to meeting different conditions, various changes in the form, and minor details of construction, may be resorted to without departing from the nature of the invention as claimed and set forth in the drawings:

Figure 1 is a perspective view showing the device in a locked position on automobile.

Figure 2 is a perspective view of the device.

Figure 3 is a detailed sectional view.

Corresponding and like parts are referred to in the following description and indicated in the several views of the drawings by like reference characters.

By referring to Figure 1 it will be seen that I have shown a floor 1 with the foot pedals 2, 3 and 4. In certain cars the operating of the same is done by means of three pedals together with an emergency brake 5. The pedal 2 is used as a brake pedal; pedal 3 is used as a reverse pedal and pedal 4 is used to place the car in neutral, low, and high gear; pedal 4, when the emergency brake 5 is thrown forward, automatically releases pedal 4 and places it into a neutral position. When the emergency brake 5 is set still further forward the machine is placed in high speed. In order to place the machine in low gear the pedal 4 is pressed forward to the extreme limit in a forwardly direction. In operating my device I place the body portion 6 over the end of the emergency brake 5 after the emergency brake 5 has been placed in what is termed a neutral position. By that movement of the emergency brake 5 the pedal 4 is automatically moved to a neutral position. The pivotally mounted bar 7 is placed back of the pedals 3 and 4 so that the hook 8 holds the pedal 4 and the hook 9 holds the pedal 3 from forward movement.

As the take-up of the machine sometimes will cause the position of the pedals 3 and 4 to change in their normal use, I have provided an adjustable locking arm 10 provided with a threaded end 11 which turns into a threaded opening 12 of the body portion 6.

At the end 13 of the body portion 6, I have provided a threaded opening 14 into which is turned a threaded adjustable securing arm 15 which has an eye 16 formed at its outer end. This eye 16 is then caused to fit over a securing member 17 which is projected through the floor 18 of the car, having a head 19 underneath the floor 18 of the car. This securing member 17 has a central threaded portion upon which is threaded a nut 20. The upper end of the securing member 17 is provided with an eye 21. In order to place the locking device in its proper position the eye 16 is now placed over the end of the securing member 17 and a padlock 22 placed through the eye 21, thereby making it impossible to remove the eye 16 from the securing member 17, and from turning the nut 20 from the securing member 17, as the same is held down by the securing arm 15 and the eye member 16.

What I claim is:

1. In a device of the class described, a body member provided with a central opening, an adjustable arm which is threaded into one end of said body member, a bar pivotally mounted at the other end of said adjustable arm, inturned hooks at each end of the bar, an adjustable locking arm threaded into the other end of said body member, an eye on the outer end of said adjustable locking arm, a securing member projecting upwardly through a floor of automobile, a nut turned down tightly against upper surface of floor of said automobile, an eye in upper end of said securing member, substantially as described for the purpose set forth.

2. In a device of the class described, the combination of a body member provided with a central opening to be slipped over a brake lever, an adjustable arm with one end threaded into said body member, a pivotally mounted bar at the other end of said arm, inturned hooks on said pivotally mounted bar engaging two foot levers so as to prevent an outward movement of said foot levers, an adjustable securing arm threaded into the other end of said body member, a securing member projecting through a floor of a car, a nut turned down against upper surface of the floor of car, an eye on end of the adjustable securing arm which fits over an end projecting above said nut, an eye in said portion projecting above said nut for the reception of a padlock, substantially as described for the purpose set forth.

In testimony whereof I affix my signature.

MALCOLM HOGG.

Witnesses:
A. E. BURKY,
C. A. HARPMAN.